(12) United States Patent
Wang

(10) Patent No.: US 12,169,044 B2
(45) Date of Patent: Dec. 17, 2024

(54) WATER CIRCULATION PIPELINE, CONTROL BOX AND MASSAGE WATER POOL

(71) Applicant: ORIENTAL RECREATIONAL PRODUCTS (SHANGHAI) CO., LTD, Shanghai (CN)

(72) Inventor: Zhiyue Wang, Shanghai (CN)

(73) Assignee: ORIENTAL RECREATIONAL PRODUCTS (SHANGHAI) CO., LTD, Shanghai (CN)

( * ) Notice: Subject to any disclaimer, the term of this patent is extended or adjusted under 35 U.S.C. 154(b) by 470 days.

(21) Appl. No.: 17/639,813

(22) PCT Filed: Aug. 14, 2020

(86) PCT No.: PCT/CN2020/109123
§ 371 (c)(1),
(2) Date: Mar. 2, 2022

(87) PCT Pub. No.: WO2021/042965
PCT Pub. Date: Mar. 11, 2021

(65) Prior Publication Data
US 2022/0325827 A1  Oct. 13, 2022

(30) Foreign Application Priority Data
Sep. 3, 2019 (CN) .......................... 201910828226.3

(51) Int. Cl.
*F16L 9/18* (2006.01)
*A61H 33/00* (2006.01)
(Continued)

(52) U.S. Cl.
CPC ............ *F16L 9/20* (2013.01); *A61H 33/0087* (2013.01); *E04H 4/12* (2013.01); *A61H 2201/5051* (2013.01); *F16L 9/18* (2013.01)

(58) Field of Classification Search
CPC .................. F16L 9/18; F16L 9/19; F16L 9/20
(Continued)

(56) References Cited

U.S. PATENT DOCUMENTS 1,960,325 A * 5/1934 Wadley ..................... F28F 1/06
165/155
3,938,233 A * 2/1976 Cannon ................... B23P 15/26
228/125
(Continued)

FOREIGN PATENT DOCUMENTS

| CN | 108332279 | 7/2018 |
|---|---|---|
| CN | 109058630 | 12/2018 |

(Continued)

OTHER PUBLICATIONS

"English translation of International Search Report of the China National Intellectual Property Administration", PCT International Application No. PCT/CN2020/109123 completed Sep. 29, 2020, mailed Oct. 28, 2020, Beijing China (2 pages).

*Primary Examiner* — Patrick F Brinson
(74) *Attorney, Agent, or Firm* — Woods Oviatt Gilman LLP; Katherine H. McGuire, Esq.

(57) ABSTRACT

Disclosed in the present invention is a water circulation pipeline, comprising: an interface pipeline, the interface pipeline comprising a first pipeline and a second pipeline, one of the first pipeline and the second pipeline being provided with water inlets, and the other being provided with a water outlet, the water inlets and the water outlet being used for being connected to a water pool body, the second pipeline being nested in the first pipeline; and a pipeline body having a third pipeline, a first port of the third pipeline being in communication with the first pipeline, and a second port of the third pipeline being in communication with the second pipeline. The present invention can reduce (Continued)

the volumes of the water circulation pipeline and a control box. Also disclosed in the present invention are a control box and a massage water pool.

19 Claims, 4 Drawing Sheets

(51) Int. Cl.
    *E04H 4/12*          (2006.01)
    *F16L 9/19*          (2006.01)

(58) Field of Classification Search
    USPC ......... 138/111, 114; 137/340, 341, 226, 515; 165/155
    See application file for complete search history.

(56) References Cited

U.S. PATENT DOCUMENTS

| | | | | |
|---|---|---|---|---|
| 4,440,217 | A * | 4/1984 | Stieler | F28D 7/103 165/145 |
| 5,076,242 | A * | 12/1991 | Parker | F02M 69/462 123/468 |
| 5,791,370 | A * | 8/1998 | Harland | F24D 17/0078 137/340 |
| 5,988,521 | A * | 11/1999 | Nohynek | B05B 1/202 137/561 A |
| 6,131,615 | A * | 10/2000 | Hartnagel | F28D 7/106 285/123.1 |
| 7,521,035 | B1 * | 4/2009 | Grob | C01B 17/585 75/530 |
| 9,371,942 | B2 * | 6/2016 | Jensen | B32B 27/34 |
| 2006/0207672 | A1 * | 9/2006 | Henriksson | F16L 55/045 138/42 |
| 2011/0303024 | A1 * | 12/2011 | Wallis | G01N 1/22 138/114 |
| 2012/0148925 | A1 * | 6/2012 | Grannell | F23D 14/62 429/408 |
| 2013/0277959 | A1 * | 10/2013 | Barthel | F16L 53/32 285/41 |

FOREIGN PATENT DOCUMENTS

| | | |
|---|---|---|
| CN | 109425098 | 3/2019 |
| CN | 211037987 | 7/2020 |
| WO | 2012017403 | 2/2012 |

* cited by examiner

WATER CIRCULATION PIPELINE, CONTROL BOX AND MASSAGE WATER POOL

TECHNICAL FIELD

The present invention relates to the technical field of leisure and entertainment equipment, in particular to a water circulation pipeline, a control box and a massage water pool.

BACKGROUND

In current urban life, due to the fact that the pace of life is fast and working pressure is high, more leisure modes are needed to improve the pleasure of life. Compared with a traditional water pool, a massage water pool has the massage and leisure functions, and people can relax the body and mind and enjoy life during bathing, so that the massage water pool is generally welcomed by people.

The massage water pool includes a water pool body and a control box, wherein a water circulation pipeline is arranged in the control box, and a heating device is arranged on a path of the water circulation pipeline and can heat water in the water pool body. Specifically, the water circulation pipeline includes two connecting ports, one connecting port is a water inlet port, the other connecting port is a water outlet port, and the water inlet port and the water outlet port are respectively connected with the water pool body. In the using process, water in the water pool body flows to the water circulation pipeline from the water inlet port, is heated by the heating device and then flows back to the water pool body from the water outlet port, so that the water in the water pool body is maintained at a proper temperature.

One problem in the prior art is that the volume of the water circulation pipeline is large, so that the volume of the control box is large, thereby causing inconvenient use.

SUMMARY

An objective of the present invention is to provide a water circulation pipeline with a small structure.

An implementation mode of the present invention discloses a water circulation pipeline, including: an interface pipeline including a first pipeline and a second pipeline, one of the first pipeline and the second pipeline being provided with water inlets, and the other one of the first pipeline and the second pipeline being provided with a water outlet, the water inlets and the water outlet being used for connecting with a water pool body respectively, and the second pipeline being nested in the first pipeline; and a pipeline body provided with a third pipeline, a first port of the third pipeline communicating with the first pipeline, and a second port of the third pipeline communicating with the second pipeline.

According to another specific implementation mode of the present invention, the implementation mode of the present invention discloses a water circulation pipeline. The first pipeline and the second pipeline are both circular pipelines, and the first pipeline and the second pipeline are coaxially arranged.

According to another specific implementation mode of the present invention, the implementation mode of the present invention discloses a water circulation pipeline. A first screwing part is arranged at one end, close to the pipeline body in an axial direction, of the first pipeline, and a second screwing part matched with the first screwing part is arranged on the pipeline body; a first clamping part is arranged at one end, close to the pipeline body in an axial direction, of the second pipeline, a second clamping part matched with the first clamping part is arranged on the pipeline body, one of the first clamping part and the second clamping part is an annular groove, and the other one of the first clamping part and the second clamping part is an annular bump, wherein the annular groove and the first screwing part are coaxially arranged.

According to another specific implementation mode of the present invention, the implementation mode of the present invention discloses a water circulation pipeline. A gap is formed between the annular groove and the annular bump in a radial direction of the second pipeline, and a sealing ring is arranged between the annular groove and the annular bump in the axial direction of the second pipeline.

According to another specific implementation mode of the present invention, the implementation mode of the present invention discloses a water circulation pipeline. Through holes are formed in a circumferential wall of the first pipeline; an annular end plate is arranged at one end, away from the pipeline body, of the interface pipeline in an axial direction of the interface pipeline, and the annular end plate is used for sealing a radial gap between the first pipeline and the second pipeline.

According to another specific implementation mode of the present invention, the implementation mode of the present invention discloses a water circulation pipeline. The first port and the second port are both located at one end, close to the interface pipeline, of the pipeline body.

According to another specific implementation mode of the present invention, the implementation mode of the present invention discloses a water circulation pipeline. The pipeline body includes a flow dividing section and a main body section, and the flow dividing section includes a housing and an inner pipe arranged in the housing; the housing is provided with a first opening and a second opening, the first opening forms the first port, the second opening communicates with one end of the main body section, the second port is formed in one end of the inner pipe, and the other end of the inner pipe communicates with the other end of the main body section.

According to another specific implementation mode of the present invention, the implementation mode of the present invention discloses a water circulation pipeline. The first opening and the second opening are located in two opposite side walls of the housing.

According to another specific implementation mode of the present invention, the implementation mode of the present invention discloses a water circulation pipeline. The inner pipe is an arc-shaped bent pipe.

According to another specific implementation mode of the present invention, the implementation mode of the present invention discloses a water circulation pipeline. The pipeline body includes a U-shaped section, and a heating device is arranged on the U-shaped section.

According to another specific implementation mode of the present invention, the implementation mode of the present invention discloses a water circulation pipeline which includes a filter pump arranged in the pipeline body.

According to another specific implementation mode of the present invention, the implementation mode of the present invention discloses a water circulation pipeline. A flow switch is arranged in the pipeline body.

An implementation mode of the present invention further discloses a control box, including the water circulation pipeline disclosed by any embodiment of the present invention.

An implementation mode of the present invention further discloses a massage water pool, including the control box disclosed by any one embodiment of the present invention.

In conclusion, according to the water circulation pipeline, the interface pipeline connected with the water pool body includes the first pipeline and the second pipeline, and the second pipeline is nested in the first pipeline, that is, the interface pipeline disclosed by the embodiment of the present invention is of a pipe-in-pipe structure which can effectively reduce the volume of the water circulation pipeline so as to reduce the volume of the control box compared with the condition that a water inlet pipe and a water outlet pipe are separately designed in the prior art.

DETAILED DESCRIPTION

Implementation modes of the present invention are illustrated by specific embodiments below, and those skilled in the art can easily understand other advantages and effects of the present invention according to the content disclosed in the specification. Although the description of the present invention will be introduced in conjunction with preferred embodiments, this does not represent that the features of the present invention are only limited in the embodiments. On the contrary, the description of the present invention in conjunction with the implementation modes is intended to cover other alternatives or modifications that may be extended based on the claims of the present invention. In order to thoroughly understand the present invention, the following description will contain many specific details. The present invention may also be implemented without using these details. In addition, in order to avoid confusion or obscuring of the key point of the present invention, some specific details are omitted in the description.

Figure 1:
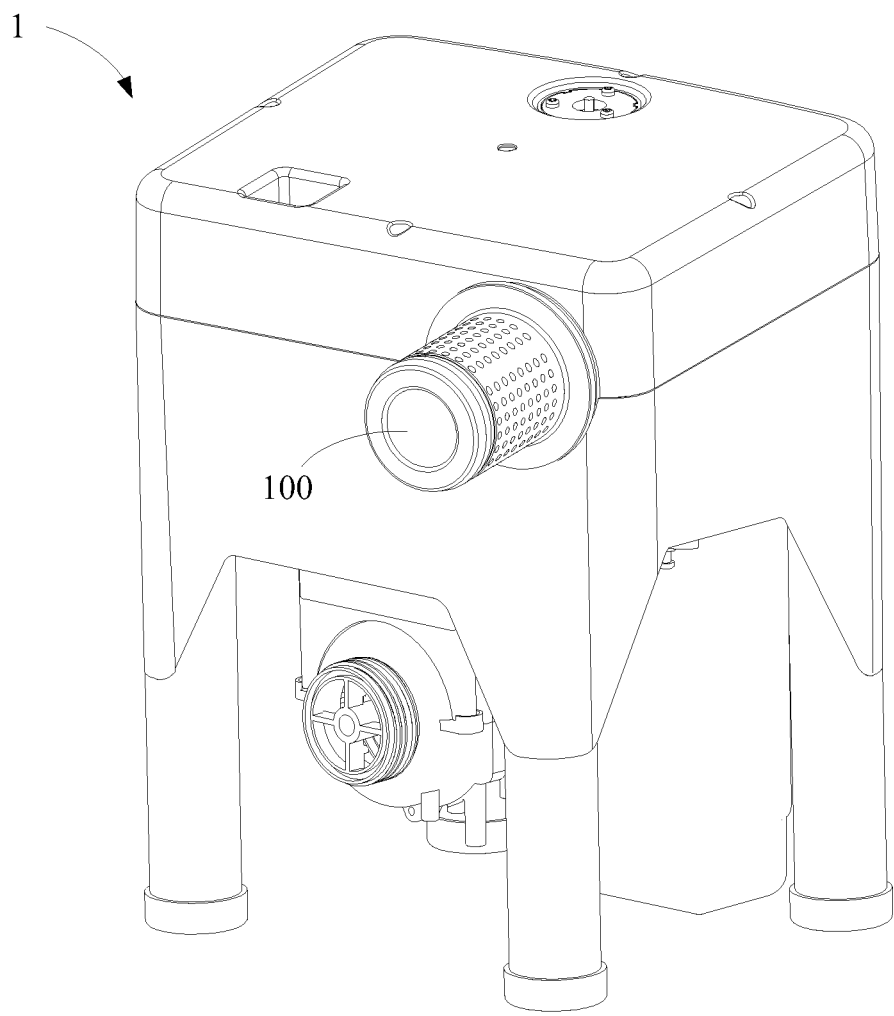
FIG. 1 is an axonometric view of a control box disclosed by an embodiment of the present invention.
Figure 2:
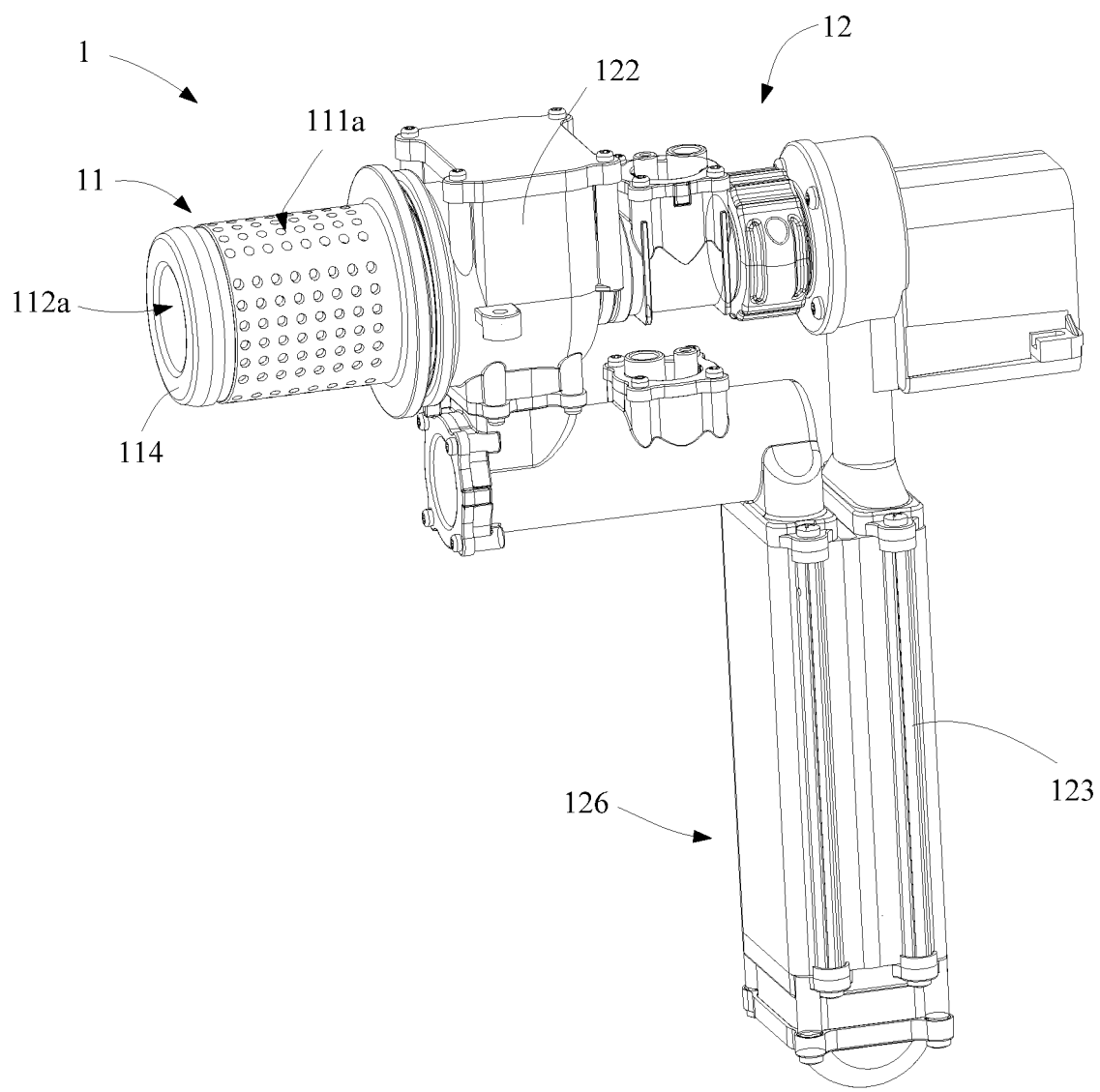
FIG. 2 is an axonometric view of a water circulation pipeline disclosed by an embodiment of the present invention.

With reference to FIG. 1 and FIG. 2, an embodiment provides a water circulation pipeline 1 and a control box 100, wherein the water circulation pipeline 1 is arranged in the control box 100. The water circulation pipeline 1 includes an interface pipeline 11 and a pipeline body 12, wherein the water circulation pipeline 1 can be connected with a water pool body through the interface pipeline 11.

Figure 3:
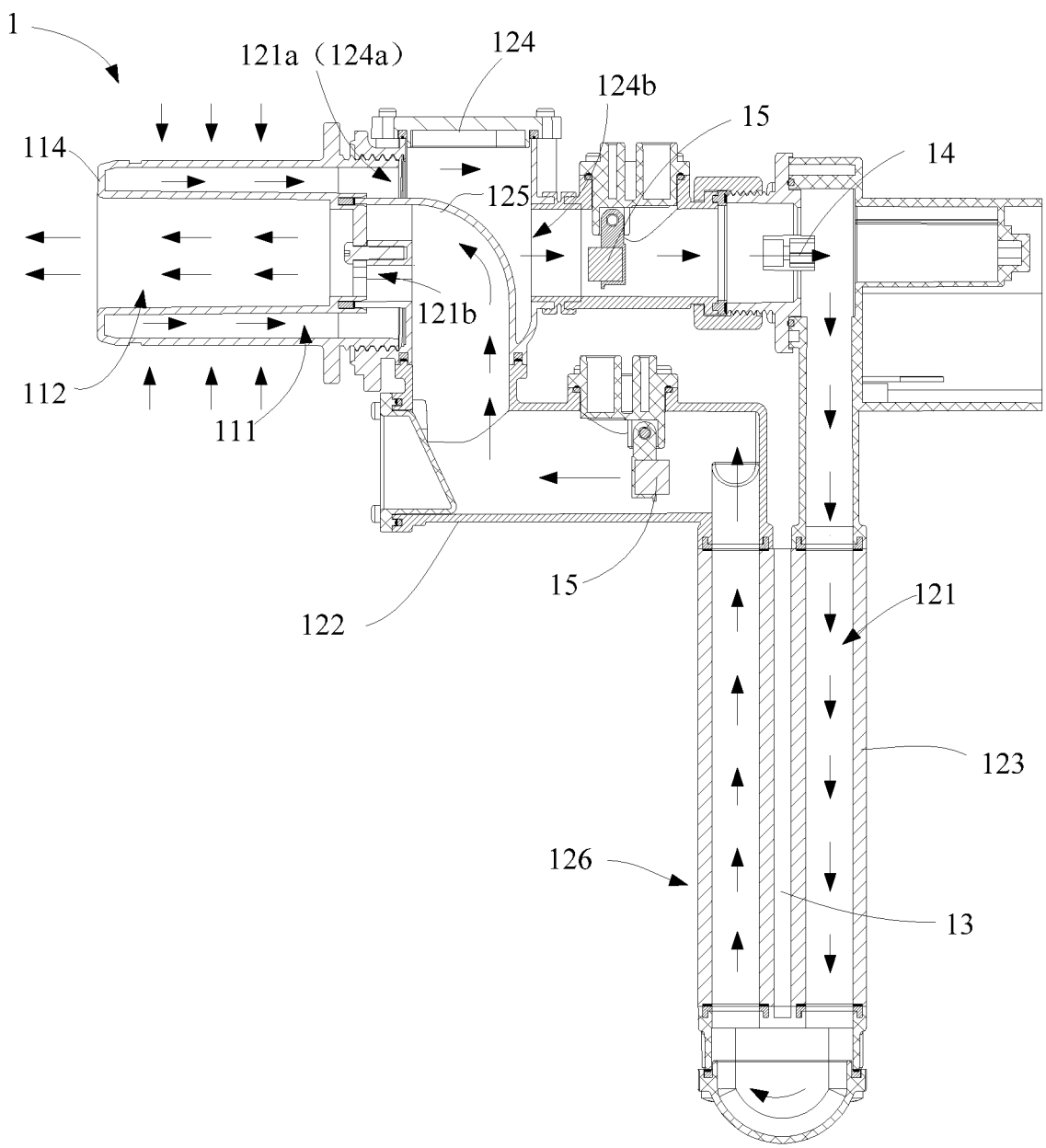
FIG. 3 is a section view of a water circulation pipeline disclosed by an embodiment of the present invention.

Specifically, with reference to FIG. 2 and FIG. 3, the interface pipeline 11 includes a first pipeline 111 and a second pipeline 112, water inlets 111a are formed in the first pipeline 111, a water outlet 112a is formed in the second pipeline 112, and the water inlets 111a and the water outlet 112a are used for connecting with the water pool body respectively. However, the present invention is not limited thereto, in other embodiments, a water outlet can be formed in the first pipeline, and a water inlet can be formed in the second pipeline.

The pipeline body 12 is provided with a third pipeline 121, the third pipeline 121 is provided with two ports, namely a first port 121a and a second port 121b, wherein the first port 121a communicates with the first pipeline 111, the second port 121b communicates with the second pipeline 112, and therefore the first pipeline 111, the second pipeline 112 and the third pipeline 121 can sequentially communicate to form the water circulation pipeline 1. In a working state, water in the water pool body can flow into the first pipeline 111 through the water inlets 111a, then sequentially passes through the first pipeline 111, the second pipeline 112 and the third pipeline 121, and finally flows back into the water pool body from the water outlet 112a.

In the embodiment, the second pipeline 112 is nested in the first pipeline 111. In other words, in the embodiment, the interface pipeline 11 is of a pipe-in-pipe structure in which a water inlet pipe and a water outlet pipe are combined together, which can effectively reduce the volume of the water circulation pipeline so as to reduce the volume of the control box compared with the condition that the water inlet pipe and the water outlet pipe are separately designed in the prior art. Besides, through the water circulation pipeline 1 provided by the embodiment, only one waterway interface needs to be arranged on the water pool body, rather than two interfaces in the prior art, so that the design of the water pool body can be simplified, and the control box 100 can be conveniently connected with the water pool body.

With reference to FIG. 2 and FIG. 3, in the embodiment, the first pipeline 111 and the second pipeline 112 are both circular pipelines, and the first pipeline 111 and the second pipeline 112 are coaxially arranged. After the arrangement, the interface pipeline 11 can be conveniently connected with the pipeline body 12. Further, the pipeline body 12 is located on an axial side of the interface pipeline 11, after the water circulation pipeline 1 is installed on the control box 100, the pipeline body 12 is located in the control box 100, and an exposed part of the water circulation pipeline 1 is only provided with one interface pipeline 11, which can make the appearance of the control box 100 simple and attractive compared with the prior art in which there are two interfaces (a water inlet and a water outlet respectively).

Figure 4:
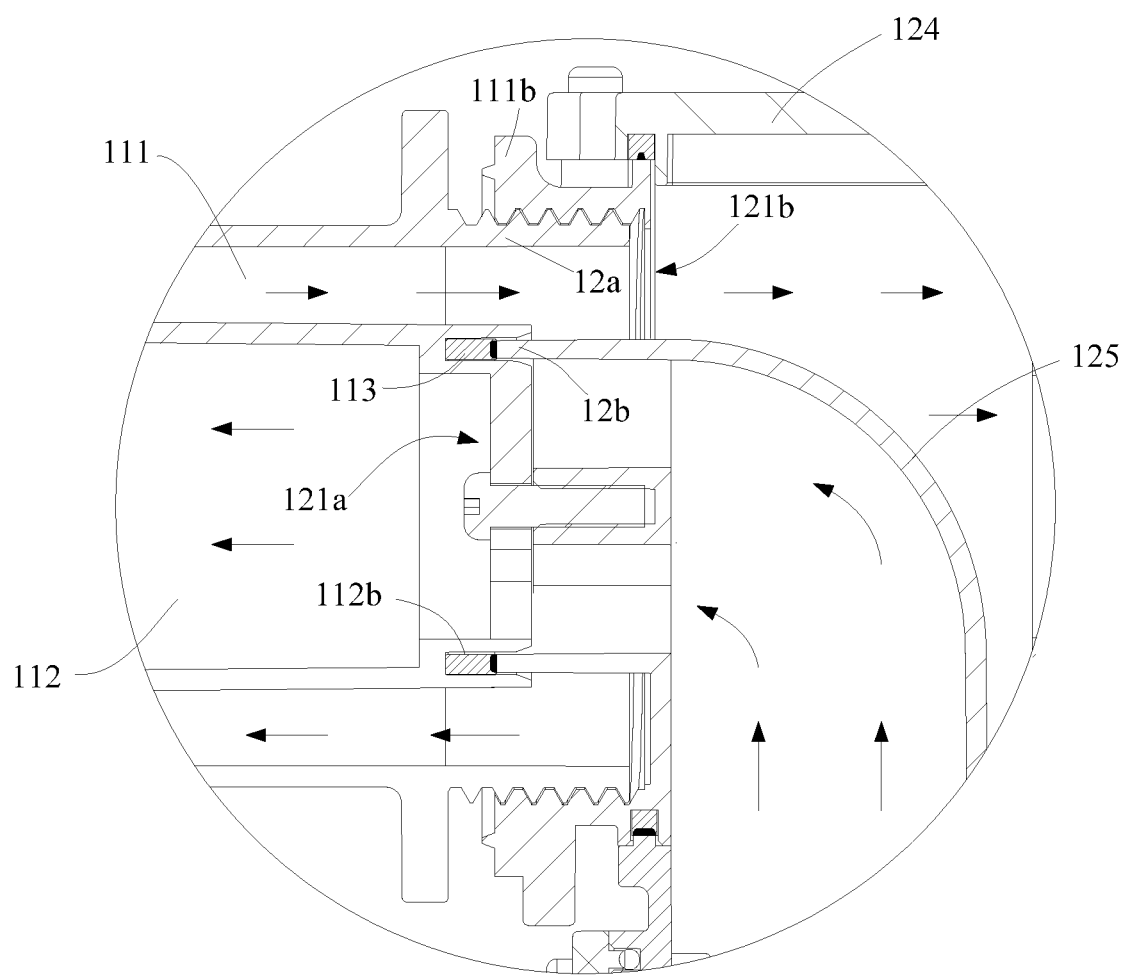
FIG. 4 is a partial enlarged view of FIG. 3.

With reference to FIG. 3 and FIG. 4, a first screwing part 111b is arranged at one end, close to the pipeline body 12 in the axial direction, of the first pipeline 111, a second screwing part 12a matched with the first screwing part 111b is arranged on the pipeline body 12, and in other words, the first screwing part 111b and the second screwing part 12a are screwed together, so that the connection between the first pipeline 111 and the pipeline body 12 is realized.

A first clamping part 112b is arranged at one end, close to the pipeline body 12 in the axial direction, of the second pipeline 112, a second clamping part 12b matched with the first clamping part 112b is arranged on the pipeline body 12, in the embodiment, the first clamping part 112b is an annular groove, the second clamping part 12b is an annular bump, the annular bump is nested in the annular groove, so that the connection between the second pipeline 112 and the pipeline body 12 can be realized. In other embodiments, the first clamping part can be set to be an annular bump, and the second clamping part can be set to be an annular groove, as long as the connection between the second pipeline and the pipeline body can be realized.

The annular groove and the first screwing part 111b are coaxially arranged. Therefore, when the first screwing part 111b is screwed with the second screwing part 12a (namely, when the first pipeline 111 is connected with the pipeline body 12), the annular groove and the annular bump are just nested with each other (namely, the second pipeline 112 is connected with the pipeline body 12).

In the embodiment, a radial gap is formed between the annular groove and the annular bump, and it should be noted that the "radial" refers to a radial direction of the second pipeline 112. Therefore, in the screwing process of the first screwing part 111*b* and the second screwing part 12*a*, there is no mutually contacted friction surface between the second pipeline 112 and the pipeline body 12, so that the interface pipeline 11 and the pipeline body 12 can be conveniently assembled. In the axial direction of the second pipeline 112, a sealing ring 113 is arranged between the annular groove and the annular bump, and in the screwing process of the first screwing part 111*b* and the second screwing part 12*a*, reliable sealing can be achieved by pressing the sealing ring 113 tightly.

With reference to FIG. 3 and FIG. 4, the first port 121*a* and the second port 121*b* of the pipeline body 12 are both located at the one end, close to the interface pipeline 11, of the pipeline body 12, specifically, the second screwing part 12*a* is arranged around the first port 121*a*, and the second clamping part 12*b* is arranged around the second port 121*b*. It can be understood that the second port 121*b* is located inside the first port 121*a* as viewed in the axial direction of the interface line 11.

With reference to FIG. 2 and FIG. 3, through holes are formed in a circumferential wall of the first pipeline 111, and equivalently, the through holes form the water inlets 111*a* of the first pipeline 111. Optionally, there are a plurality of through holes, and the plurality of through holes are regularly formed in the circumferential wall of the first pipeline 111, so that water flow is uniform. Further, in the axial direction of the interface pipeline 11, an annular end plate 114 is arranged at one end, away from the pipeline body 12, of the interface pipeline 11, and the annular end plate 114 is used for sealing a radial gap between the first pipeline 111 and the second pipeline 112. Equivalently, the first pipeline 111 and the second pipeline 112 are isolated from each other through the annular end plate 114 at the other end, far away from the pipeline body 12, of the interface pipeline 11, and a water outlet 112*a* of the second pipeline 112 is formed in one end, far away from the pipeline body 12, of the second pipeline 112.

With reference to FIG. 2, FIG. 3, and FIG. 4, in the embodiment, the pipeline body 12 includes a flow dividing section 122 and a main body section 123, wherein the flow dividing section 122 includes a housing 124 and an inner pipe 125 arranged in the housing 124. The housing 124 is provided with a first opening 124*a* and a second opening 124*b*, wherein the first opening 124*a* of the housing 124 forms a first port 121*a* of the flow dividing section 122 and communicates with the first pipeline 111, and the second opening 124*b* of the housing 124 communicates with one end of the main body section 123; and one end of the inner pipe 125 forms a second port 121*b* of the flow dividing section 122 and communicates with the second pipeline 112, and the other end of the inner pipe 125 communicates with the other end of the main body section 123. Therefore, a cavity between the housing 124 and the inner pipe 125, the main body section 123 and the inner pipe 125 communicate in sequence so as to form a third pipeline 121.

Further, the first opening 124*a* and the second opening 124*b* are formed in two opposite side walls of the housing 124, and therefore, after water in the first pipeline 111 flows to the flow dividing section 122, the water flows to a right side wall from a left side wall of the flow dividing section 122. Further, the inner pipe 125 is an arc-shaped bent pipe, one port of the inner pipe 125 is formed in a bottom wall of the housing 124, and therefore water in the inner pipe 125 flows to the left side wall from a bottom wall of the flow dividing section 122 and then flows into the second pipeline 112.

Optionally, with reference to FIG. 3, the flow dividing section 122 includes a body and a cover body which are detachably connected so as to facilitate manufacturing and assembly.

In the embodiment, the pipeline body 12 includes a U-shaped section 126, and a heating device 13 (for example, a PTC heater) is arranged on the U-shaped section 126 so as to heat water flowing into the water circulation pipeline 1. In addition, the heating device 13 is arranged on the U-shaped section 126, which can heat bidirectional water flows at the same time, thereby improving the heating efficiency.

With reference to FIG. 3, in the embodiment, a filter pump 14 is further arranged in the pipeline body 12, not only can filter water in the pipeline, but also can be used for limiting the flowing direction of the water. In the embodiment, the filter pump 14 is arranged so that the water flowing direction is: the first pipeline 111→the third pipeline 121→the second pipeline 112 (as shown in an arrow direction in FIG. 3). It can be understood that in another embodiment, by reversely arranging the filter pump 14, the water flowing direction may be: the second pipeline 112→the third pipeline 121→the first pipeline 111 (which corresponds to the above description that in other embodiments, a water outlet is formed in the first pipeline, and a water inlet is formed in the second pipeline). In addition, a flow switch 15 is further arranged in the pipeline body 12.

The embodiment of the present invention further provides a massage water pool (not shown), including a water pool body and the control box 100 provided by the embodiment of the present invention, wherein the interface pipeline 11 of the water circulation pipeline 1 is connected with the water pool body.

In conclusion, the above embodiments provided by the present invention only exemplarily illustrate the principle and effects of the present invention, rather than limiting the present invention. Those skilled in the art can modify or change the above embodiments without violating the spirit and scope of the present invention.

Therefore, all equivalent modifications or changes, which are generally completed by those of ordinary skill in the art without departing from the spirit and technical thoughts disclosed by the present invention, still should be covered by the claims of the present invention.

The invention claimed is:

1. A water circulation pipeline, comprising:
   an interface pipeline, comprising a first pipeline and a second pipeline, one of the first pipeline and the second pipeline being provided with a water inlet, the other one of the first pipeline and the second pipeline being provided with a water outlet, the water inlet and the water outlet being used for connecting with a water pool body respectively, and the second pipeline being nested in the first pipeline; and
   a pipeline body, being provided with a third pipeline, wherein a first port of the third pipeline communicates with the first pipeline, and a second port of the third pipeline communicates with the second pipeline.

2. The water circulation pipeline according to claim 1, wherein the first pipeline and the second pipeline are both circular pipelines, and the first pipeline and the second pipeline are coaxially arranged.

3. The water circulation pipeline according to claim 2, wherein a first screwing part is arranged at one end, close to the pipeline body in an axial direction, of the first pipeline, and a second screwing part matched with the first screwing part is arranged on the pipeline body; and a first clamping part is arranged at one end, close to the pipeline body in an axial direction, of the second pipeline, a second clamping part matched with the first clamping part is arranged on the pipeline body, one of the first clamping part and the second clamping part is an annular groove, and the other one of the first clamping part and the second clamping part is an annular bump, wherein the annular groove and the first screwing part are coaxially arranged.

4. The water circulation pipeline according to claim 3, wherein a gap is formed between the annular groove and the annular bump in a radial direction of the second pipeline, and a sealing ring is arranged between the annular groove and the annular bump in the axial direction of the second pipeline.

5. The water circulation pipeline according to claim 2, wherein a through hole is formed in a circumferential wall of the first pipeline; and an annular end plate is arranged at one end, away from the pipeline body, of the interface pipeline in an axial direction of the interface pipeline, and the annular end plate is used for sealing a radial gap between the first pipeline and the second pipeline.

6. The water circulation pipeline according to claim 2, wherein the first port and the second port are both located in one end, close to the interface pipeline, of the pipeline body.

7. The water circulation pipeline according to claim 1, wherein the pipeline body comprises a flow dividing section and a main body section, wherein the flow dividing section comprises a housing and an inner pipe arranged in the housing;

the housing is provided with a first opening and a second opening, the first opening forms the first port, and the second opening communicates with one end of the main body section; and the second port is formed in one end of the inner pipe, and the other end of the inner pipe communicates with the other end of the main body section.

8. The water circulation pipeline according to claim 7, wherein the first opening and the second opening are located in two opposite side walls of the housing.

9. The water circulation pipeline according to claim 7, wherein the inner pipe is an arc-shaped bent pipe.

10. The water circulation pipeline according to claim 1, wherein the pipeline body comprises a U-shaped section, and a heating device is arranged on the U-shaped section.

11. The water circulation pipeline according to claim 1, wherein a filter pump is arranged in the pipeline body.

12. The water circulation pipeline according to claim 1, wherein a flow switch is arranged in the pipeline body.

13. A control box, comprising the water circulation pipeline according to claim 1.

14. A massage water pool, comprising the control box of claim 13.

15. A control box, comprising the water circulation pipeline according to claim 2.

16. A control box, comprising the water circulation pipeline according to claim 3.

17. A control box, comprising the water circulation pipeline according to claim 4.

18. A control box, comprising the water circulation pipeline according to claim 5.

19. A control box, comprising the water circulation pipeline according to claim 6.

* * * * *